United States Patent
Kelly et al.

(10) Patent No.: US 6,498,470 B2
(45) Date of Patent: Dec. 24, 2002

(54) INSULATIVE CONTACT SENSOR

(75) Inventors: Jeff M. Kelly, Phoenix, AZ (US); Benton C. Lewis, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 48 days.

(21) Appl. No.: 09/798,566

(22) Filed: Mar. 2, 2001

(65) Prior Publication Data

US 2002/0125875 A1 Sep. 12, 2002

(51) Int. Cl.$^7$ ................................................ G01N 27/00
(52) U.S. Cl. ...................... 324/71.5; 340/686.3
(58) Field of Search ............................. 324/71.5, 174, 324/699, 700; 340/598, 652, 679, 682, 686.3; 384/448, 624; 73/7

(56) References Cited

U.S. PATENT DOCUMENTS

| | | |
|---|---|---|
| 3,102,759 A | 9/1963 | Stewart |
| 3,108,264 A | 10/1963 | Heinoo |
| 3,775,680 A | 11/1973 | Egeland |
| 3,824,579 A | 7/1974 | Waseleski, Jr. et al. |
| 3,897,116 A | 7/1975 | Carpenter |
| 4,063,786 A | 12/1977 | Rall |
| 4,584,865 A | 4/1986 | Hutchins |
| 5,017,912 A | 5/1991 | Willis |
| 5,408,225 A * | 4/1995 | Stadelhofer .................. 340/686 |
| 5,509,310 A * | 4/1996 | El-Ibiary ...................... 73/660 |
| 5,701,119 A | 12/1997 | Jurras, III |
| 5,865,543 A * | 2/1999 | Maclean ....................... 384/448 |
| 6,080,982 A * | 6/2000 | Cohen ................... 250/227.11 |
| 6,280,092 B1 * | 8/2001 | Backus et al. .............. 384/425 |

* cited by examiner

Primary Examiner—Christine Oda
Assistant Examiner—Etienne LeRoux
(74) Attorney, Agent, or Firm—Robert Desmond, Esq.

(57) ABSTRACT

A system for detecting imminent failure of rotatable equipment that has lost centerline control and is near catastrophic failure is housed in a linear tubular element within which is permanently potted a thin gage insulated wire protected by an optional fuse. The contact end of the wire is located immediately adjacent to a semiconductor disk and an optional abradable disk placed at close proximity to the rotatable equipment being monitored. The thin gage insulated wire return is connected between the fuse and the semiconductor disk providing an electrical return path for detection of a change in electrical continuity. The semiconductor and abradable disks between the contact wire and the rotatable equipment act as insulators from errant grounding. Loss of rotatable equipment centerline control will cause physical contact between the contact wire and rotatable equipment, breaking electrical continuity, the resulting ground path being instantly detected through the internally potted fuse.

19 Claims, 5 Drawing Sheets

INSULATIVE CONTACT SENSOR

GOVERNMENT RIGHTS

This invention was made with Government support under Contract No. F41608-92-C-0772 awarded by the US Army Aviation and Troop Command (ATCOM) Component Improvement Program. The Government has certain rights in this invention.

BACKGROUND OF THE INVENTION

The present invention generally relates to electronic sensors and, more particularly, to apparatus for remote electronic monitoring and detection of imminent failure of high speed rotating equipment such as for aerospace applications where power, weight, and electrical supply are severely restricted.

In various machine structures with high-speed relative moving parts it is of utmost importance to detect imminent component failure. Such failure could lead to costly damages and/or catastrophic loss of life and equipment, as would be the case for many aerospace applications. The simplest techniques for detection of imminent component failure are by means of periodic visual inspections, manual measurements, or by detection of secondary phenomena such as noise levels, temperature variations, or the like. These detection methods are accomplished at considerable effort and expense, frequently produce questionable or unreliable results, and are of no use whatsoever to warn of imminent failure when the machinery is operational, and in flight as would usually be the case for aerospace applications.

Electrical and temperature detection means have been used widely in the past in an effort to monitor operating performance of machine structures with relative moving parts. Most have involved monitoring and detection of bearing wear. Of particular interest in this regard are the following references and examples:

U.S. Pat. No. 3,102,759, Sept. 3, 1963, for Journal Bearing Wear Detector, involves the use of an insulated wire embedded in the bearing material as a wear detector in railroad car journal bearings. When the bearing material has worn to expose the wire, an applied current will short circuit through the bearing and an appropriate indicator will expose the short circuit.

U.S. Pat. No. 3,108,264, Oct. 22, 1963, for Bearing Wear Sensor, employs a bearing wear monitor device incorporating small diameter wires connected to a normally energized holding coil. The wear monitor device is installed at very close proximity to a shaft such that when the shaft bearing wears a predetermined amount, the wire insulation rubs off and the holding coil short-circuits.

U.S. Pat. No. 3,775,680, Nov. 27, 1973, for Device for the Detection of Wear, discloses placement of an electrical resistor on the wear surface of a machine element, such as a bearing. The current carrying cross section of the resistor is reduced as a function of wear, the extent of which is measurable with suitable electrical circuits.

U.S. Pat. No. 3,824,579, Jul. 16, 1974, for Apparatus for Monitoring Bearing Temperature and for Protecting Bearing from Overtemperature, involves placement of a temperature responsive thermistor at close proximity to a bearing. As the bearing changes in temperature, the thermistor experiences a corresponding change in resistance, which is sensed by a protection circuit. Upon overheating, a switch is actuated either to shut down the associated equipment or to energize an indicator alarm.

U.S. Pat. No. 3,897,116, Jul. 29, 1975, for Bearing Wear Detector, provides for a bearing wear detector comprised of an element carried by a shaft and another similar element, which incorporates an insulating coating, fixed to the shaft housing. As the shaft moves excessively due to bearing wear, the two elements contact each other, wear through the insulating coating, and activate an alarm circuit.

U.S. Pat. No. 4,063,786, Dec. 20, 1977, for Self-Lubricating Auxiliary Bearing With a Main Bearing Failure Indicator, discloses an auxiliary bearing, which engages upon main bearing failure thus providing for temporary continued operation until the associated equipment can be shut down. An electrical alarm circuit is also activated when the auxiliary bearing engages, causing the abrading of insulation from an electrical probe.

U.S. Pat. No. 4,584,865, Apr. 29, 1986, for Device and Method for Testing for Motor Bearing Wear, discloses use of a conductive ring element fixed to a rotor stator, while another similar ring element is attached to the rotating rotor. One of the elements is coated with non-conductive material, and means are provided for measuring the resistance between the two ring elements. As the motor bearings wear, displacement of the rotating ring element causes wear of the non-conductive coating, causing a corresponding decrease in resistance.

U.S. Pat. No. 5,017,912, May 21, 1991, for Electrical Detection of Shear Pin Operation, relates to a shear pin with electrical resistance characteristics, the status of which is monitored by an electrical detection circuit which can identify anomalous conditions. Corrective or preventive action is possible based on signals indicating that the shear pin has been sheared or crushed by excess mechanical loads.

U.S. Pat. No. 5,701,119, Dec. 23, 1997, for Linear Bearing with Wear Sensors, relates to a bearing liner equipped with electrically isolated electrical conductors. The liner is positioned between inner (rotatable) and outer (fixed) bearing rings, and is fixed to the stationary ring. Wear on the bearing liner causes the inner ring to contact and electrically connect the electrical conductors, a condition which is detected by an electrical circuit, thereby warning of excessive wear.

Other conventional sensors, such as Bentley probe, monopoles, and contact switches have been used to detect various failure modes of rotating equipment. Bently probes are Proximity sensors/probes, and are used for measurement of the gap or "proximity" on rotating equipment. The usual applications of these devices require employment of substantial structural supporting elements, significant external electrical power sources, and the sensors are only able to detect the occurrence of major performance anomalies, rather than imminent failures.

These references and examples, however, suffer from one or more of the following disadvantages:

a) The rotating speed is lower then normally encountered in aerospace applications.

b) Many of the cited devices are designed to indicate gradual wear rather then imminent failure.

c) An external electrical source must be applied to detect wear or failure.

d) An independent electrical monitoring system and electrical supply system is required to obtain the desired measurements.

e) Excessive weight prevents use of the system for aerospace applications.

f) Temperature changes are measured to indicate wear, and such changes are unduly slow to detect high-speed aerospace failure modes.

g) The detection system requires excessively high electrical power sources.

h) The weight of the detection system is excessive for aerospace applications.

For the foregoing reasons, there is need for a light-weight device capable of operating under conditions where power and electrical supply are severely limited, and be able to detect and provide a timely warning when high speed rotating equipment is in danger of imminent failure.

SUMMARY OF THE INVENTION

A sensor is provided to detect imminent failure of rotatable equipment that has lost centerline control and is near catastrophic failure. The sensor system is comprised of a linear stainless steel tube, the inner surface of which is tightly lined with a non-metallic tube. Permanently potted within the combined tube element is a thin gage insulated input wire with a fuse connected in series, and thin gage insulated return wire. The end of the input wire, the contact wire, is placed in direct contact with a disk made of a semiconductor material. Bonded to the semiconductor disk is another disk made of an abradable material. The return wire is connected between the fuse and the semiconductor disk and provides an electrical return path for detection of a change in electrical continuity.

The complete sensor system is placed at close proximity to the rotatable equipment being monitored. The abradable and semiconductor disks, between the contact wire and the rotatable equipment, act as insulators from errant grounding. Loss of rotatable equipment centerline control will cause physical contact between the contact wire and rotatable equipment, breaking electrical continuity, the resulting ground path being instantly detected by the fuse as well as other electronic circuit performance monitoring equipment.

These and other features, aspects and advantages of the present invention will become better understood with reference to the following drawings, description and claims.

DETAILED DESCRIPTION OF THE INVENTION

Figure 1:
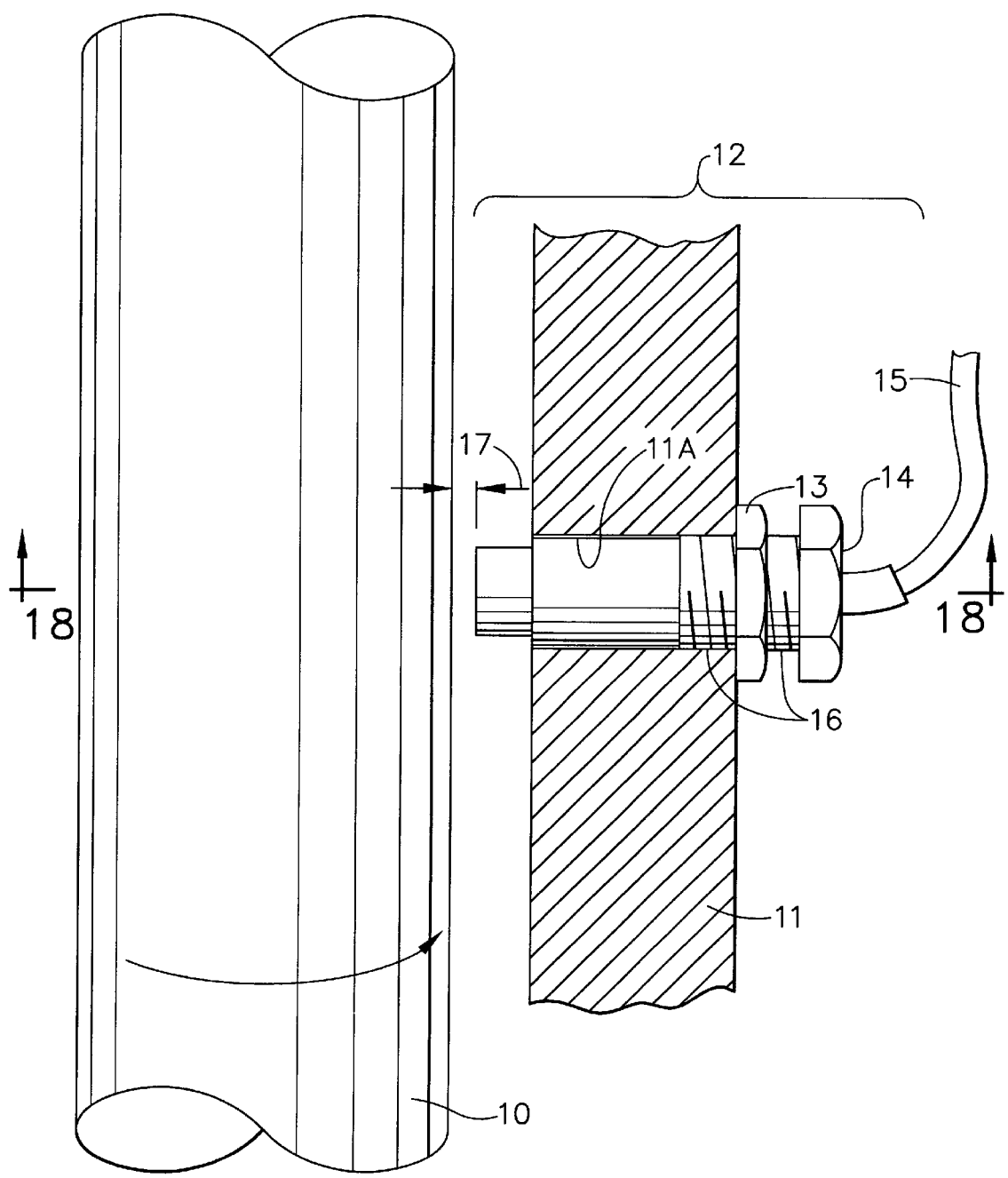
FIG. 1 is an elevational and partially sectional view of the Semiconductor Contact Sensor of the present invention installed on a rotatable shaft housing immediately adjacent to a typical rotatable shaft.

Referring to the drawings and particularly to FIG. 1, there is shown an elevational and partially cross sectional view of a rotatable shaft 10 immediately adjacent to one end of the inventive, linear, tubular shaped, sensor assembly 12. The sensor assembly 12 is firmly secured to the rotatable shaft housing 11 at a threaded bore 11A which serves as the receptor for the male threaded segment 16. Using nut fitting 14 as an installation aid, the sensor assembly 12 is threaded into the threaded bore 11A to a predetermined depth such that a desired sensor-to-rotatable shaft gap 17 is accurately achieved. The dimension of the gap 17 can be varied for different applications and rotatable equipment models. As the gap 17 decreases, the sensitivity of the sensor increases such that it will detect minute variations in rotatable shaft centerline control.

A threaded locking nut 13, matching the diameter of the male thread portion 16, rigidly secures the sensor assembly 12 to the rotatable shaft housing 11. Insulated electrical wires 15 are routed away from the sensor assembly 12 to sensing electronic circuitry (not shown).

Figure 2:
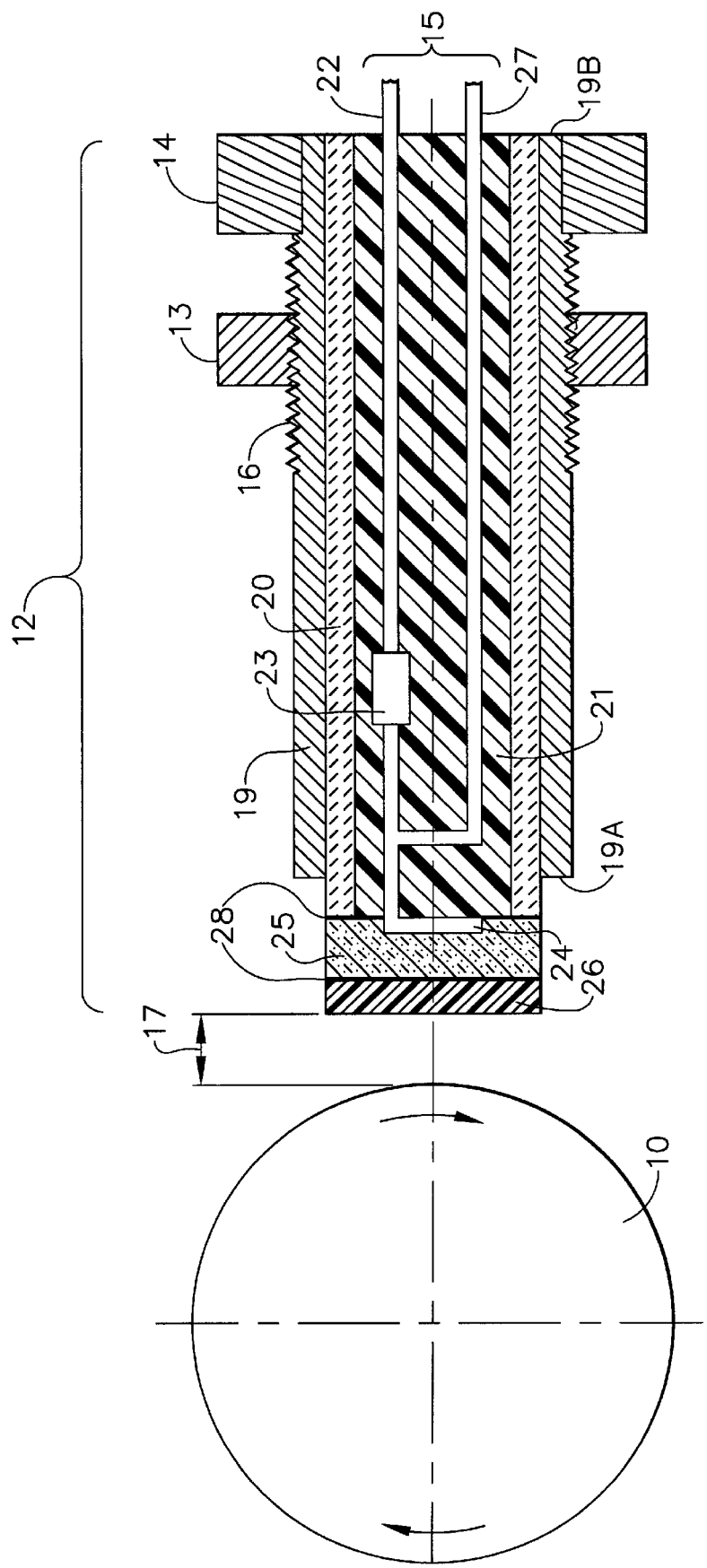
FIG. 2 is a sectional view of the preferred embodiment of the Semiconductor Contact Sensor taken along the plane as indicated by the line 18—18 of FIG. 1.

More specific details of the preferred embodiment of the Semiconductor Contact Sensor are shown in FIG. 2, which is a sectional view taken along the plane as indicated by the line 18—18 of FIG. 1. The outer structure is comprised of a linear steel tube 19, preferably thin walled and of stainless steel, having a diameter of about $\frac{3}{8}$ of an inch and a wall thickness of about $\frac{1}{16}$ of an inch. The steel tube 19 end closest to the rotatable shaft 10 is the sensor end 19A, and the opposing end is the non-sensor end 19B. A male threaded segment 16 is located in close proximity to the non-sensor end 19B. It provides a means to engage the sensor assembly 12 to the rotatable shaft housing 11 and also provides for engagement of the threaded locking nut 13. The nut fitting 14 is rigidly secured, such as by bonding or welding, to the outer circumference of the non-sensor end 19B of the steel tube 19.

The inner surface of the steel tube 19 is tightly sleeved with a linear non-metallic tube 20 of a material having physical characteristics similar to Nomex™, and preferably being heat shrinkable and fire resistant. The non-metallic tube 20 is slightly longer than the steel tube 19 with one end fitting flush along the non-sensor end 19B, and the other end extending beyond the steel tube 19, a distance of about $\frac{3}{8}$ of an inch. Two insulated electrical wires 15, preferably about 22 gage, comprised of an input wire 22 and a return wire 27, are routed longitudinally through the non-metallic tube 20. The terminal end of the input wire 22 is attached to the inside surface of a semiconductor disk 25, forming the contact wire 24. The semiconductor disk 25 has the same diameter as the non-metallic tube 20, is about 0.020 inches thick, and is made of a material similar to Printed Circuit Board, and has non-conductive electrical characteristics. The semiconductor disk 25 is rigidly bonded, preferably with an adhesive such as epoxy, to the non-metallic tube. An abradable disk 26, having the same diameter as the semiconductor disk 25, and about 0.100 inches thick(nominal), is also rigidly bonded, preferably with an adhesive such as epoxy, to the external surface of the semiconductor disk 25.

A current limiting fuse 23, which has low current characteristics, is connected in series to the input wire 22 as it passes at close proximity to the semiconductor disk 25. The return wire 27 is connected to the input wire between the fuse 23 and the semiconductor disk 25, providing the requisite return path for monitoring electrical continuity of the circuit. The input wire 22, fuse 23, and return wire 27 are all rigidly fixed within the non-metallic tube 22 by means of an epoxy potting compound, which has high temperature adhesive characteristics.

Figure 3:
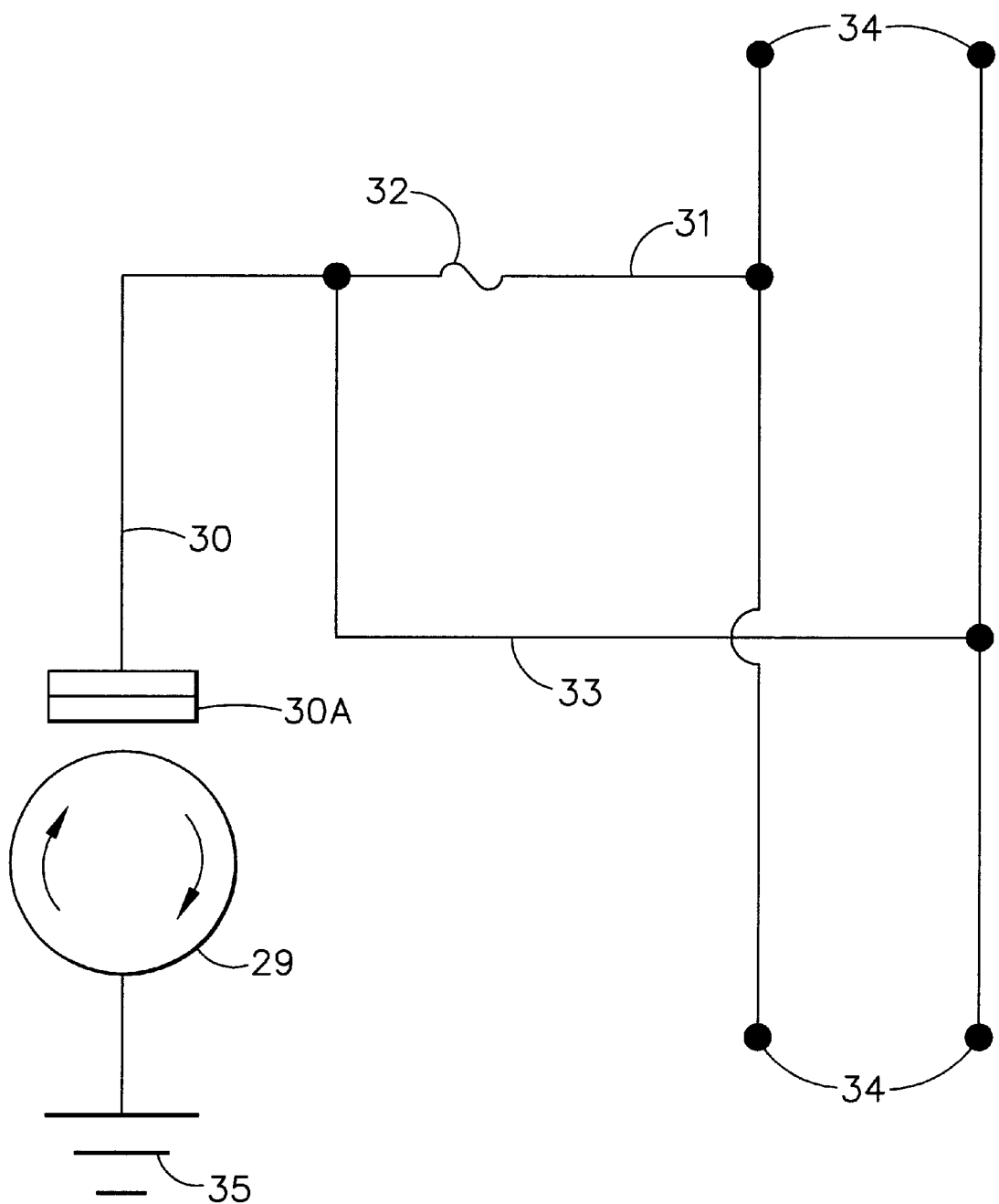
FIG. 3 is a schematic representation of the electrical circuitry used in conjunction with the preferred embodiment of the Semiconductor Contact Sensor.

Referring to FIG. 3, there is shown a schematic representation of the electrical circuitry used in conjunction with the preferred embodiment of the Semiconductor Contact Sensor. During normal operation of the rotatable shaft 29, the contact wire 30 is isolated by virtue of the combined semiconductor and abradable disks 30A, and current flows through the input wire 31, the fuse 32, the contact wire, and back through the return wire 33 to digital or analog electrical monitoring systems upstream and downstream of terminals 34. Imminent failure of the rotatable shaft 29 is characterized by the loss of centerline control, resulting in a wobbling motion which will cause contact with and rapidly wear away the combined semiconductor and abradable disks 30A, with the resulting grounding of contact wire 30. The immediate result will be a short circuit, loss of electrical continuity through fuse 32, and detection of the anomalous condition by the digital or analog electrical monitoring systems upstream and downstream of terminals 34. The warning of imminent failure will be provided in sufficient time to avert a catastrophic loss of equipment and/or human life, as would most likely be the case where the Semiconductor Contact Sensor is utilized in conjunction with high speed rotating equipment on military and commercial aircraft and related aerospace applications.

Figure 4:
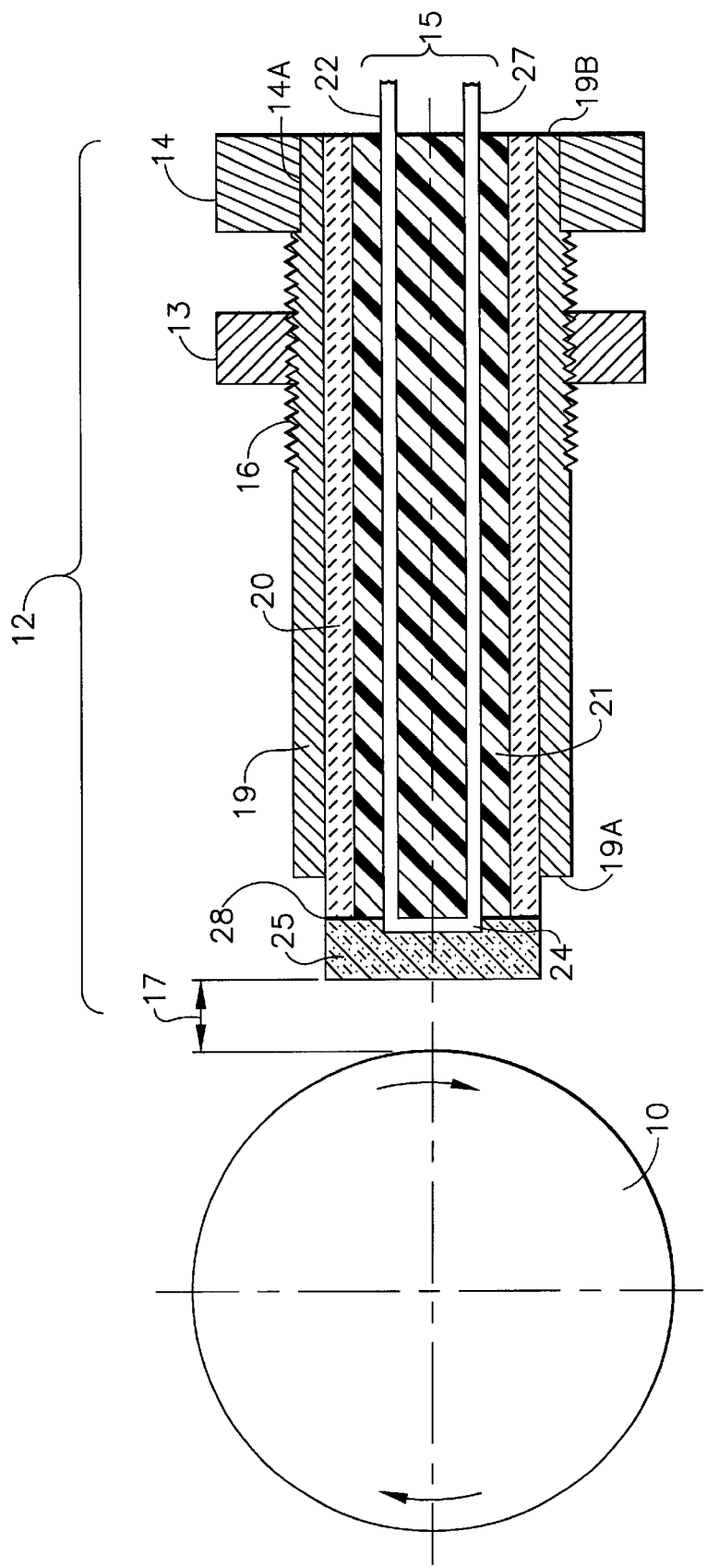
FIG. 4 is a sectional view of a second embodiment of the Semiconductor Contact Sensor taken along the plane as indicated by the line 18—18 of FIG. 1.

FIG. 4, which is a sectional view taken along the plane as indicated by the line 18—18 of FIG. 1, shows a second embodiment of the proposed semiconductor contact sensor. The outer structure is comprised of a steel tube 19, preferably thin walled and of stainless steel, having a diameter of about ⅜ of an inch and a wall thickness of about 1/16 of an inch. The steel tube 19 end closest to the rotatable shaft 10 is the sensor end 19A, and the opposing end is the non-sensor end 19B. A male threaded segment 16 is located in close proximity to the non-sensor end 19B. It provides a means to engage the sensor assembly 12 to the rotatable shaft housing 11 and also provides for engagement of the threaded locking nut 13. The nut fitting 14 is rigidly secured, such as by bonding or welding, to the outer circumference of the non-sensor end 19B of the steel tube 19.

The inner surface of the steel tube 19 is tightly sleeved with a non-metallic tube 20 of a material having physical characteristics similar to Nomex™, and preferably being heat shrinkable and fire resistant. The non-metallic tube 20 is slightly longer than the steel tube 19 with one end fitting flush along the non-sensor end 19B, and the other end extending beyond the steel tube 19, a distance of about ⅜ of an inch. Two insulated electrical wires 15, preferably about 22 gage, comprised of an input wire 22 and a return wire 27, are routed longitudinally through the non-metallic tube 20. The terminal end of the input wire 22 is attached to the inside surface of a semiconductor disk 25, forming the contact wire 24. The semiconductor disk 25 has the same diameter as the non-metallic tube 20, is about 0.020 inches thick, and is made of a material similar to Printed Circuit Board, and has non-conductive electrical characteristics. The semiconductor disk 25 is rigidly bonded, preferably with an adhesive such as epoxy, to the non-metallic tube.

The input wire 22 and the return wire 27 are connected to each other by means of the contact wire 24, providing the requisite return path for monitoring electrical continuity of the circuit. The input wire 22 and return wire 27 are rigidly fixed within the non-metallic tube 22 by means of an epoxy potting compound such which has high temperature adhesive characteristics.

Figure 5:
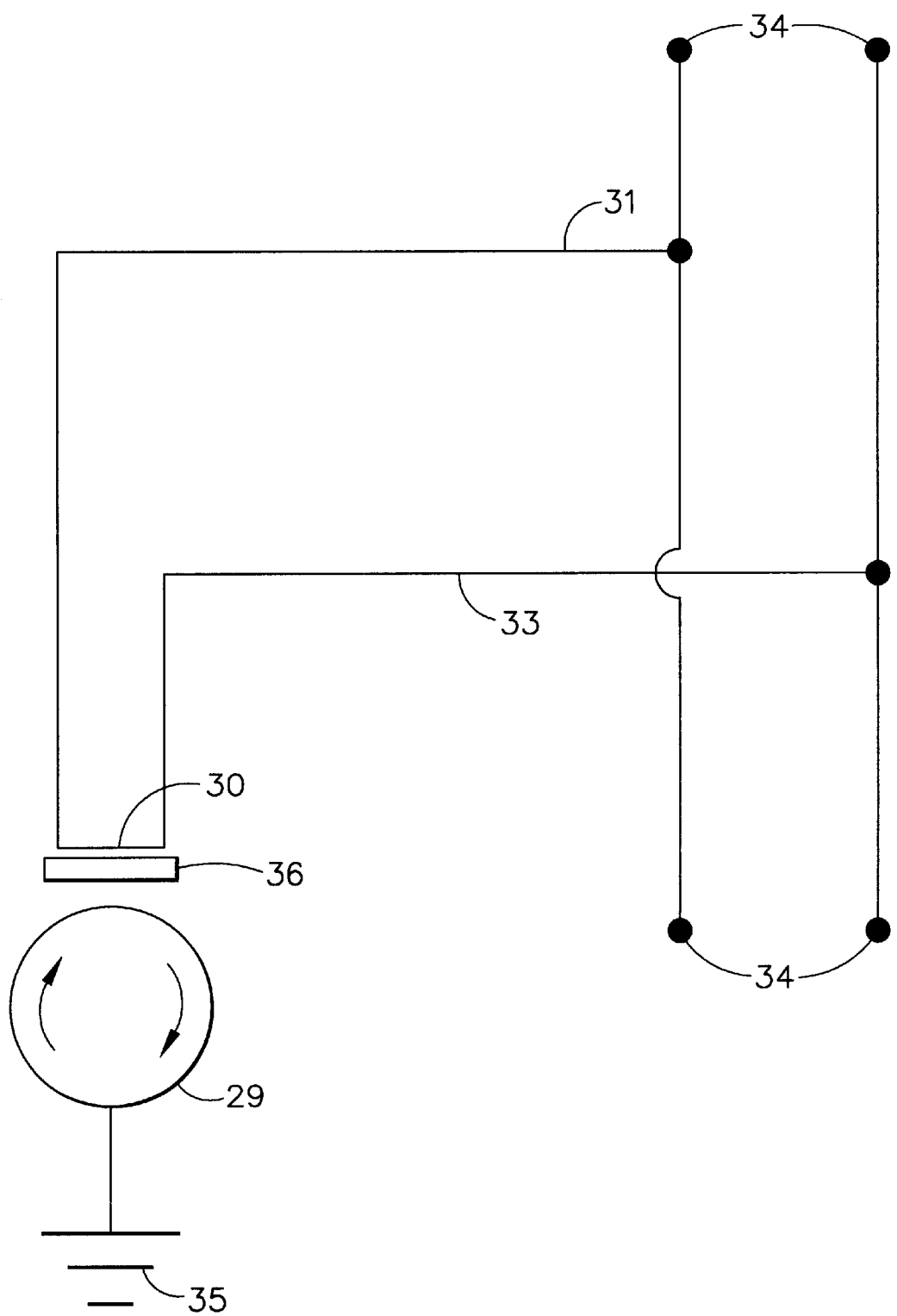
FIG. 5 is a schematic representation of the electrical circuitry used in conjunction the second embodiment of the Semiconductor Contact Sensor.

Referring to FIG. 5, there is shown a schematic representation of the electrical circuitry used in conjunction with the second embodiment of the Semiconductor Contact Sensor. During normal operation of the rotatable shaft 29, the contact wire 30 is isolated by virtue of the semiconductor disk 36, and current flows through the input wire 31, the contact wire 30, and back through the return wire 33 to digital or analog electrical monitoring systems upstream and downstream of terminals 34. Imminent failure of the rotatable shaft 29 is characterized by the loss of centerline control, resulting in a wobbling motion which will cause contact with and rapidly wear away the semiconductor disk 36, with the resulting grounding of contact wire 30. The immediate result will be a short circuit, and detection of the anomalous condition by the digital or analog electrical monitoring systems upstream and downstream of terminals 34. The warning of imminent failure will be provided in sufficient time to avert a catastrophic loss of equipment and/or human like, as would most likely be the case where the Semiconductor Contact Sensor is utilized in conjunction with high speed rotating equipment on military and commercial aircraft and related aerospace applications.

From the above description, it will be apparent that the present invention provides an effective, and convenient means of detecting imminent failure of high speed rotatable equipment that has lost centerline control and is near catastrophic failure. The inventive system is lightweight, requires minimal electrical power, and is particularly adaptable to aerospace applications.

Although the present invention has been described in considerable detail with reference to certain preferred versions thereof, other versions are possible. Therefore, the spirit and scope of the appended claims should not be limited to the description of the preferred versions contained therein.

What is claimed is:

1. A sensor system for rotatable equipment failure detection, the system comprising:

a linear tubular element having two opposite ends comprising a sensor end and a non-sensor end;

an electrical contact wire located at the sensing end of the linear tubular element;

an electrical input wire routed longitudinally through an interior of the linear tubular element having a first end at said non-sensor end of the linear tubular element, and a second end electrically contacting said electrical contact wire;

a fuse connected to and in series with the electrical input wire;

an electrical return wire, connected to the electrical input wire between the fuse and the electrical contact wire, and routed longitudinally through the interior of the linear tubular element to the non-sensing end;

a semiconductor disk proximally located to the electrical contact wire, and attached to the sensing end of the linear tubular element;

an abradable disk proximally located and attached to an exterior flat surface of the semiconductor disk;

a potting compound securing the electrical contact wire, the fuse, the electrical input wire, and the electrical return wire within the interior of the linear tubular element;

whereby when said sensor system is placed immediately adjacent to a rotatable shaft experiencing loss of centerline control, wear of the abradable and semiconductor disks will result in contact of the rotatable shaft and contact wire element, resulting in a short circuit, loss of electrical continuity through the fuse, and immediate detection of imminent failure of the rotatable shaft.

2. The sensor system for rotatable equipment failure detection of claim 1, wherein the linear tubular element is comprised of a linear non-metallic tube co-axially located and tightly fitting inside a larger diameter metallic tube.

3. The sensor system for rotatable equipment failure detection of claim 1, wherein the electrical input and electrical return wires are insulated and of about 22 gage diameter.

4. The sensor system for rotatable equipment failure detection of claim 1, wherein the fuse located in series with the electrical input wire has low current electrical characteristics.

5. The sensor system for rotatable equipment failure detection of claim 1, wherein the semiconductor disk has a diameter about equivalent to the diameter of the linear non-metallic tube and a thickness of about 0.020 inches.

6. The sensor system for rotatable equipment failure detection of claim 1, wherein the abradable disk has a diameter about equivalent to the diameter of the linear non-metallic tube and a thickness of about 0.100 inches.

7. The sensor system for rotatable equipment failure detection of claim 1, wherein the potting compound securing the electrical contact wire, the fuse, the electrical input wire, and the electrical return wire within the interior of the linear tubular element has high temperature adhesive characteristics.

8. A sensor system for rotatable equipment failure detection, the system comprising:
- a linear tubular element having two opposite ends comprising a sensor end and a non-sensor end;
- an electrical contact wire located at the sensing end of the linear tubular element;
- an electrical input wire routed longitudinally through an interior of the linear tubular element having a first end at said non-sensor end of the linear tubular element, and a second end electrically contacting said electrical contact wire;
- an electrical return wire, connected to the electrical input wire between the fuse and the electrical contact wire at a point within the interior of the linear tubular element, and routed longitudinally through the interior of the linear tubular element to the non-sensing end of the linear tubular element;
- a semiconductor disk proximally located to the electrical contact wire, and attached to the sensing end of the linear tubular element;
- a potting compound securing the electrical contact wire, the electrical input wire, and the electrical return wire within the interior of the linear tubular element;
- whereby when said sensor system is placed immediately adjacent to a rotatable shaft experiencing loss of centerline control, wear of the abradable and semiconductor disks will result in contact of the rotatable shaft and contact wire element, resulting in a short circuit, loss of electrical continuity through the fuse, and immediate detection of imminent failure of the rotatable shaft.

9. The sensor system for rotatable equipment failure detection of claim 8, wherein the linear tubular element is comprised of a linear non-metallic tube co-axially located and tightly fitting inside a larger diameter metallic tube.

10. The sensor system for rotatable equipment failure detection of claim 8, wherein the electrical input and electrical return wires are insulated and of about 22 gage diameter.

11. The sensor system for rotatable equipment failure detection of claim 8, wherein the semiconductor disk has a diameter about equivalent to the diameter of the linear non-metallic tube and a thickness of about 0.020 inches.

12. The sensor system for rotatable equipment failure detection of claim 8, wherein the potting compound securing the electrical contact wire, the electrical input wire, and the electrical return wire within the interior of the linear tubular element has high temperature adhesive characteristics.

13. A sensor system for rotatable equipment failure detection, the system comprising:
- a linear tubular element having two opposite ends comprising a sensor end and a non-sensor end;
- an electrical contact wire located at the sensing end of the linear tubular element;
- an electrical input wire routed longitudinally through an interior of the linear tubular element having a first end at said non-sensor end of the linear tubular element, and a second end electrically contacting said electrical contact wire;
- an electrical return wire, having a first end connected to the electrical input wire at a point within the interior of the linear tubular element routed longitudinally through the interior of the linear tubular element to a second end at the non-sensing end of the linear tubular element;
- an electrical monitoring system detecting a loss of continuity between said first end of said electrical input wire and said second end of said electrical return wire where the electrical monitoring system is connected to and in series with the electrical input wire;
- a semiconductor disk proximally located to the electrical contact wire, and attached to the sensing end of the linear tubular element;
- an abradable disk proximally located and attached to an exterior flat surface of the semiconductor disk;
- a potting compound securing the electrical contact wire, the fuse, the electrical input wire, and the electrical return wire within the interior of the linear tubular element;
- whereby when said sensor system is placed immediately adjacent to a rotatable shaft experiencing loss of centerline control, wear of the abradable and semiconductor disks will result in contact of the rotatable shaft and contact wire element, resulting in a short circuit, loss of electrical continuity through the fuse, and immediate detection of imminent failure of the rotatable shaft.

14. The sensor system for rotatable equipment failure detection of claim 13, where the electrical return wire is connected to the electrical input wire between the electrical monitoring system and the electrical contact wire.

15. The sensor system for rotatable equipment failure detection of claim 14, wherein the electrical input and electrical return wires are insulated and of about 22 gage diameter.

16. The sensor system for rotatable equipment failure detection of claim 14, wherein the electrical monitoring system located in series with the electrical input wire has low current electrical characteristics.

17. The sensor system for rotatable equipment failure detection of claim 14, wherein the semiconductor disk has a diameter about equivalent to the diameter of the linear non-metallic tube and a thickness of about 0.020 inches.

18. The sensor system for rotatable equipment failure detection of claim 14, wherein the abradable disk has a diameter about equivalent to the diameter of the linear non-metallic tube and a thickness of about 0.100 inches.

19. The sensor system for rotatable equipment failure detection of claim 14, wherein the potting compound securing the electrical contact wire, the fuse, the electrical input wire, and the electrical return wire within the interior of the linear tubular element has high temperature adhesive characteristics.

* * * * *